United States Patent [19]
Moen et al.

[11] Patent Number: 5,839,866
[45] Date of Patent: Nov. 24, 1998

[54] MECHANICAL OVERLOAD PROTECTION DEVICE

[75] Inventors: Terje Moen, Sandnes, Norway; Erik Peter V. Eriksen, The Woodlands, Tex.; Tarald Gudmestad, Naerbo, Norway

[73] Assignee: Weatherford/Lamb, Inc., Houston, Tex.

[21] Appl. No.: 809,829

[22] PCT Filed: Sep. 29, 1995

[86] PCT No.: PCT/NO95/00174

§ 371 Date: May 27, 1997

§ 102(e) Date: May 27, 1997

[87] PCT Pub. No.: WO96/11344

PCT Pub. Date: Apr. 18, 1996

[30] Foreign Application Priority Data

Oct. 5, 1994 [NO] Norway .................................... 943718

[51] Int. Cl.[6] .............................. F16B 31/00; F16D 9/00; F16L 35/00

[52] U.S. Cl. ................................ 411/5; 411/411; 248/909; 403/2; 403/DIG. 3; 285/2; 285/4

[58] Field of Search ..................................... 411/2–5, 411, 411/426; 403/2, DIG. 3; 248/909; 405/259.6; 285/2, 4

[56] References Cited

U.S. PATENT DOCUMENTS

| | | | |
|---|---|---|---|
| 1,173,620 | 2/1916 | Thompson | 251/149.1 |
| 2,299,643 | 10/1942 | Moody | 251/149.1 |
| 2,889,162 | 6/1959 | Norris | 403/2 |
| 3,236,543 | 2/1966 | Mueller | 285/423 |
| 4,059,288 | 11/1977 | Mohr | 285/2 |
| 4,098,438 | 7/1978 | Taylor | 222/529 |
| 4,448,447 | 5/1984 | Funk et al. | 285/4 |
| 4,687,365 | 8/1987 | Promersberger | 403/2 |
| 4,854,338 | 8/1989 | Grantham | 137/68.1 |
| 5,033,925 | 7/1991 | Moghe | 411/908 X |
| 5,050,911 | 9/1991 | Morrison | 285/2 |
| 5,127,783 | 7/1992 | Moghe et al. | 411/908 X |
| 5,226,766 | 7/1993 | Lasner | 411/426 X |
| 5,443,332 | 8/1995 | Hollis | 405/259.6 |
| 5,470,118 | 11/1995 | Burton | 403/2 X |
| 5,560,257 | 10/1996 | DeBisschop et al. | 403/2 X |

OTHER PUBLICATIONS

Our Customers Wanted A Better Breakaway . . . We Brought Them A Breakthrough, OPW Fueling Components Group, 1987.

Safe–T–Break, Husky Corp., 1986.

*Primary Examiner*—Neill R. Wilson
*Attorney, Agent, or Firm*—Guy McClung

[57] ABSTRACT

A new overload protection device has been invented of the type in which components are fixed mutually by means of a safety member adapted to be cut or broken when the components are subjected to an overload, wherein the safety member is a thread spiral or spirals adapted to be cut loose from a member, rod or sleeve when the thread spiral (or spirals) is subjected to an overload.

6 Claims, 3 Drawing Sheets

5,839,866

MECHANICAL OVERLOAD PROTECTION DEVICE

BACKGROUND OF THE INVENTION

1. Field of the Invention

This invention relates to a mechanical overload protection device of the type adapted to be released when an appearing force exceeds a predetermined value.

2. Description of Related Art including Information Disclosure under 37 CRF 1.97–1.99.

There are several types of overload protection devices used in order to protect equipment against demages due to mechanical overload. It is usual that two or more parts displace themselves mutually when an overload is released, this displacement normally leading to that the overload ceases or becomes harmless.

Shear pins adapted to break upon the occurence of a predetermined shear force represent one of the oldest known mechanical overload protection devices, and shear pins are still much in use.

Also, shear pins are included as functional members in various devices, in which shear pins intentionally are cut as a part of the normal mode of operation of the device. In connection with oil wells, it is e.g. common to lock plugs and other downhole equipment in shear pin devices. Upon the occurence of a force applied thereto, typically through an increase of the pressure in the well liquid, the shear pins are broken and a desired function is effected, such as opening or closing a valve, loosening a plug, uncoupling a coiled tubing from a tool wedged thereto and other things.

Upon the occurence of brief and more or less accidental excesses of the allowed maximum force, it is often desirable that the overload protection device is not activated, i.e. that overload protection devices in some cases should have a certain inertia.

The invention directs itself toward uses where it is usual to use shear pins and may, in many cases, advantageously replace shear pins.

A disadvantage of shear pins is that they often must be overdimensioned in order to avoid that they are broken upon a brief accidental extra strain, and this reduces the security and safety. In many relations it is also a disadvantage of shear pins that they are weakened as soon as the cutting off process has started, a fact that lead to the breakage of the shear pins even if the force is reduced below the upper allowed value.

It is known to combine shear pins having different dimensions or made of various materials in order to achieve a stepwise release of a protection device. The number of shear pins may also be varied. Then, a first set of shear pins are broken at a lower force than a second set of shear pins. This is also utilized in equipment where shear pins are incorporated as a part of the function of the equipment. A first functional step is activated e.g. by breaking one set of shear pins, breaking a second set of shear pins activating the next functional step. In order to obtain a safe function in equipment of this type, it is necessary to have a relatively large difference in shear force between the various sets of shear pins. In connection with downhole operations in oil wells, it has happened that shear pins have released a locking device too soon, with expensive consequences.

SUMMARY OF THE INVENTION

An object of the invention is to provide an overload protection device which is as simple as shear pins, and which simultaneously allows continued functioning after brief excesses of a predetermined upper force value. Another object of the invention is to provide an overload protection device where a possible overload is allowed to act over a predetermined distance before the overload protection device is released. A third object of the invention it that it should absorb substantially more energy than shear pins released upon the occurence of a corresponding load, and that the overload protection device thereby shall be capable of being used to absorb impacts and to retard dangerous mass in motion. A further object of the invention is to provide an overload protection device where the maximum force allowed at any time is a function of a distance over which a possible preceding overload has acted.

The objects are achieved through the features as defined in the following claims.

BRIEF DESCRIPTION OF THE DRAWINGS

In the following, the invention is described by means of a general examplary embodiment and, thereafter, the invention is described as used in a downhole plug device which is used with cementing of liners in oil wells. Reference is made to the attached drawings, wherein.

DESCRIPTION OF THE PREFERRED EMBODIMENTS

Figure 1:
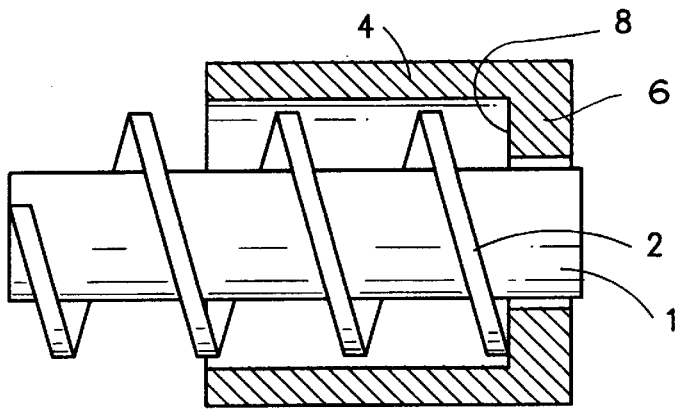
FIG. 1 shows in side elevational view, partly in section, an overload protection device prior to the same being subjected to an overload.
Figure 2:
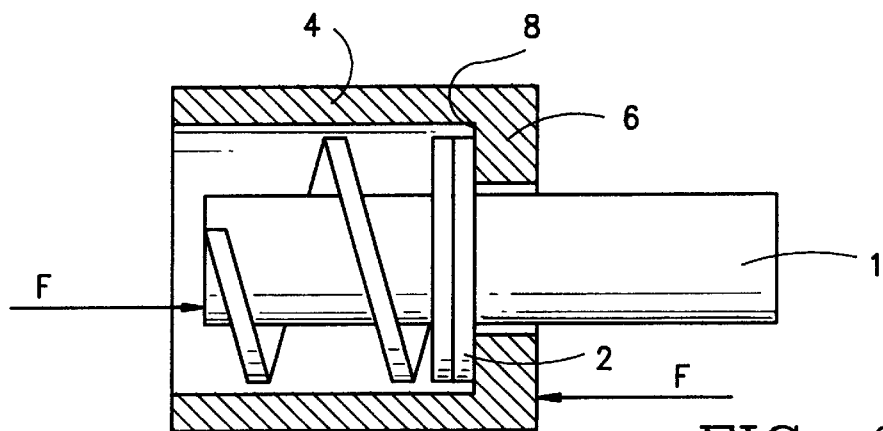
FIG. 2 shows the same overload protection device as in FIG. 1 subsequent to being subjected to a brief overload.
Figure 3:
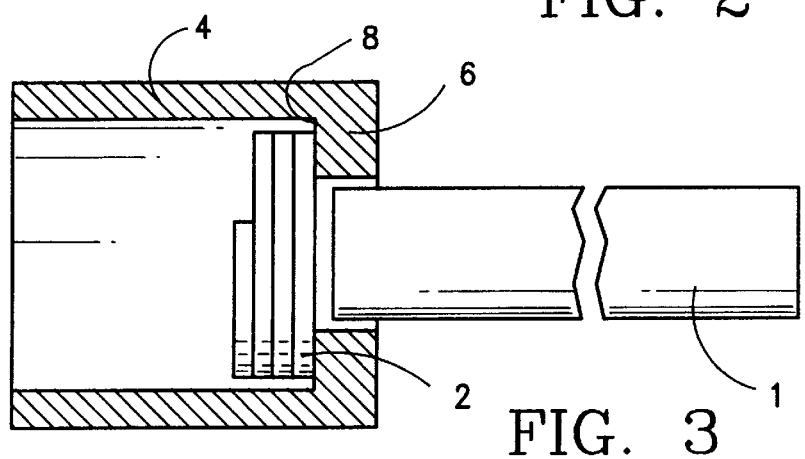
FIG. 3 shows the same overload protection device as in FIG. 2 after the overload protection device has released.

In FIGS. 1, 2 and 3, reference numeral 1 denotes a rod which, along a portion of the length thereof, is provided with an external thread spiral 2. A sleeve 4 having an internal diameter slightly exceeding the external diameter of the thread spiral 2, is at one end 6 thereof provided with a portion having a reduced internal diameter, thus forming an inwardly directed annular end wall 8 in the sleeve 4. When the overload protection device is mounted and ready for use, one end of the thread spiral 2 rests against the end wall 8, the rod 1 projecting out of the sleeve 4 at the end 6 thereof.

When the rod 1 and the sleeve 4 are subjected to a force, which in FIG. 2 is indicated at the letter F, the end of the thread spiral 2 is pressed against the end wall 8. Due to the angle which the threads of the thread spiral 2 form with the longitudinal axis, the force F is accommodated in a limited cross-section or shear zone of the thread spiral 2, adjacent the contact point with the end wall 8, and shearing stress between the thread spiral 2 and the rod 1 arise. When the force F increases to the predetermined limit for overload, the shearing strength of the material is exceeded in the shear zone, and the thread spiral is cut. The angle of the cut thread spiral 2 changes and the threads become substantially parallel to the end wall. Thus, a new shear zone arises where the angle for the thread spiral 2 is changed, and as long as the force F is maintained, cutting of the thread spiral 2 will continue in a shear zone moving along the thread spiral 2.

Thus, the thread spiral 2 is gradually cut loose from the rod 1 as long as the force F exceeds the overload value. The thread spiral 2 is compressed such that each cut spiral winding rests on the previously cut spiral winding. When all spiral windings are cut, the rod 1 is loose and can no more accommodate the force F. The overload protection device is fully released, see FIG. 3.

If the force F is reduced to a value smaller than the overload value before all the windings of the thread spiral 2 are cut, cutting of the thread spiral will stop. Thus, the rod 1 may still accommodate a force 1 which is smaller than the predetermined overload limit. If the force F once more exceeds the overload limit, the thread spiral 2 is cut further.

Through varying the material thickness or pitch of the thread spiral 2 along the length of the spiral, the overload limit can be varied. A desired course of forces may then be choosen in advance.

In order to avoid an oblique position of the rod in relation to the sleeve 4, the rod 1 may advantageously be provided with a thread spiral 2 having two or more courses.

Alternatively, the thread spiral 2 may be disposed as an internal spiral in a sleeve and may be cut by pulling a rod having a shoulder through the sleeve.

An overload protection device according to the invention acts impact absorbing due to the ability thereof to accommodate a force over a distance.

Figure 3A:
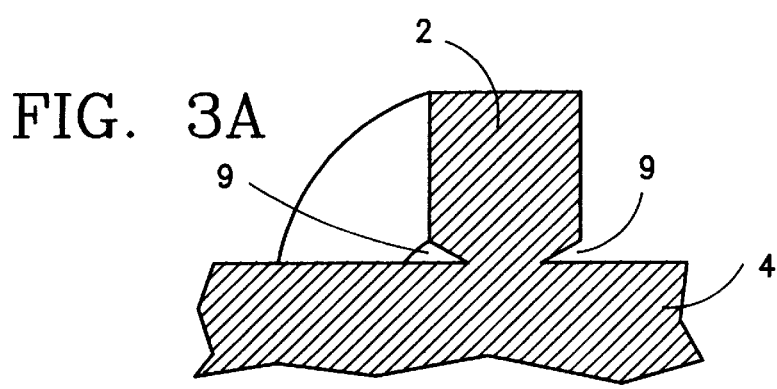
FIG. 3A shows, on a larger scale, a section through a thread spiral.

The clearance between the rod 1 and the aperture at the end 6 of the sleeve should be small. The shear face between the rod 1 and the thread spiral 2 may become uneven in some types of materials, and there exists a risk of tearing between the rod 1 and the sleeve 4 upon the shear face's passage past the end 6 of the sleeve 4. An uneven shear face may also be torn when it passes through a previously cut thread spiral. In order to eliminate this problem, the thread spiral 2 may advantageously be provided with a breaking initiation in the form of a groove 9 extending along the side faces of the thread spiral, preferably along the foot of the thread spiral 2, such as shown in FIG. 3A.

As an example of a use with which the invention advantageously may be utilized, a plug device for use in cementing liners in connection with drilling of oil and gas wells is described in the following. In the plug device which is of a type known per se, it is usual to use shear pins in order to achieve the intentional function.

In cementing liners, casting mass is pumped out into the annulus between liner and formation. The casting mass is pumped down through a liner which is connected to the top of the liner to be cemented, and further down through the liner to the lower end thereof and out into the annulus. In order to avoid that the casting mass is mixed with liquid in the well, the casting mass is defined by means of two plugs, one in front of and one behind the casting mass which is driven forwardly by means of a pressure liquid. As the liner has a substantially larger diameter than the supply pipe, it is difficult to make one and the same plug to seal both internally in the supply pipe and internally in the liner. In order to achieve sealing in both pipes, a special plug device is used.

Figure 4:
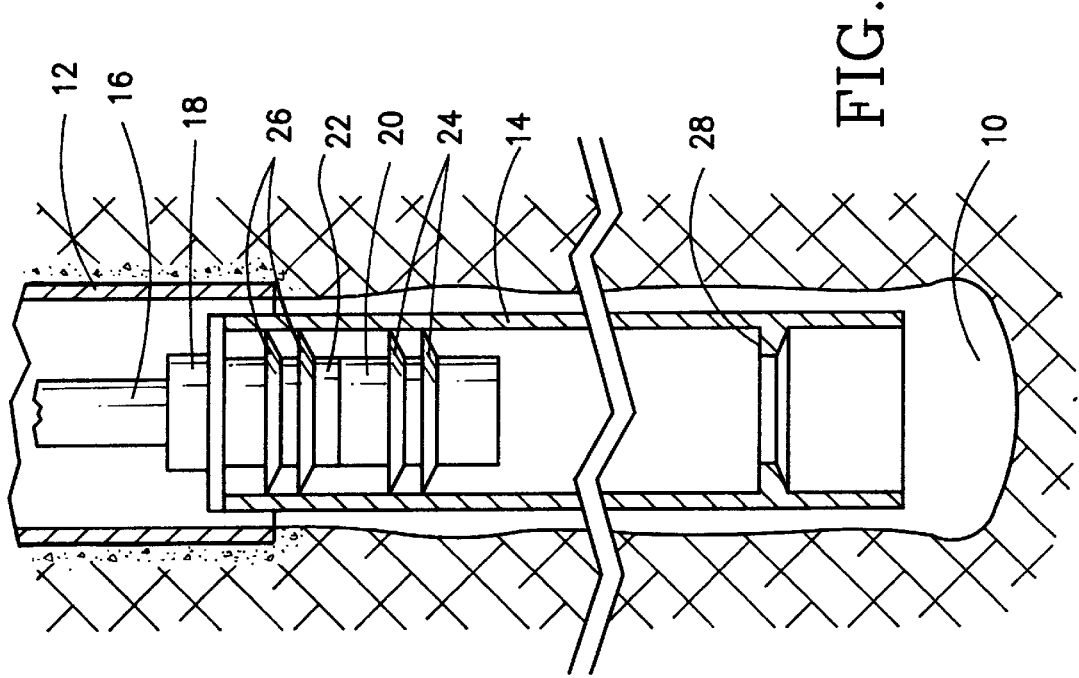
FIG. 4 shows diagrammatically in side elevational view, partly in section, an oil well having two interconnected plugs for use in cementing a liner.

First, the plug device is described generally with reference to FIG. 4, in which an oil well 10 is lined with a casing 12, and a liner 14 is ready to be cemented down to the bottom of the well 10. At the upper end thereof, the liner 14 is connected to a supply pipe 16 for casting mass having a coupling device 18. In the liner 14, at the upper end thereof, a first annular plug 20 has been placed and attached below a second annular plug 22 which, again, is attached below the coupling device 18. Each of the annular plugs 20, 22 has a central through-goung aperture, the supply pipe 16 communicating with the liner 14.

In the supply pipe 16 is mounted a first plug adapted to seal slidingly against the inner wall of the supply pipe 16, whereafter casting mass is pumped into the supply pipe 16, driving the first plug forwardly.

When the first plug reaches first annular plug 20, the through aperture thereof is blocked. By increasing the pump pressure, the operator then releases an overload protection device, and first annular plug 20 is disconnected from second annular plug 22. Thereafter, casting mass is pumped through second annular plug's through aperture and drives first plug and first annular plug as a gathered unit downwardly along the liner 14 until first annular plug 20 lands on and seals against an annular land face 28 close to the lower end of the liner 14.

In order to force the casting mass past first annular plug 20, the operator once more increases the pumping pressure, and an overload protection device releases, with the result that first plug is pressed through first annular plug 20 and falls down through the annular land face 28, free passage to the well 10 being established.

After the measured casting mass has come into the supply pipe 16, a second plug is inserted and driven further forwardly by means of pressure liquid. When second plug comes into second annular plug 22, the through aperture thereof is blocked, and the liquid pressure increases in the supply pipe 16. An overload protection device releases, and a second annular plug 22 is released from the coupling device 18. Second plug and second annular plug 22 are together driven further down into the liner 14 until second annular plug 22 lands on first annular plug 20, and substantially all casting mass has been pressed out from the liner 14.

In the foregoing, it has been mentioned on several occasions how overload protection devices are used as a part of the plug system's mode of operation. In the following, an account is given of how an overload protection device according to the invention can be used in connection with the release of a first ring plug 20 from a second ring plug 22, and further in connection with opening first ring plug 20 after it has landed on the land face 28 close to the lower end of the liner 14.

Figure 5:
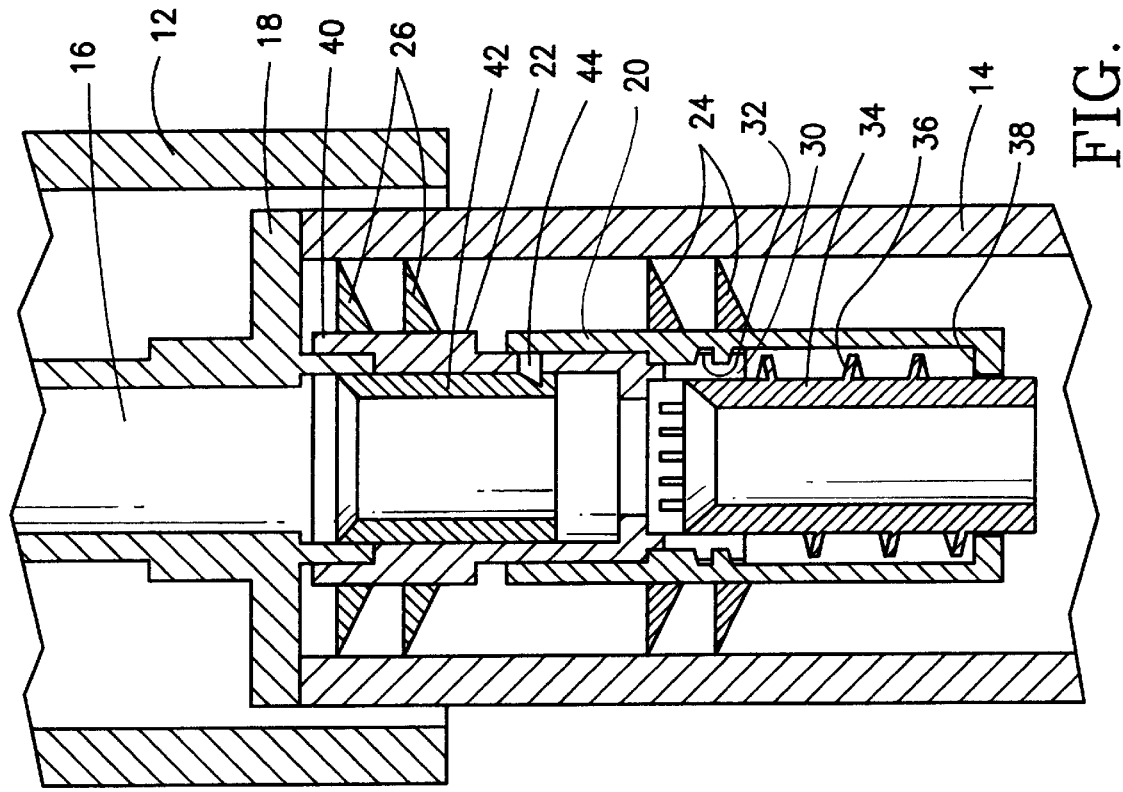
FIG. 5 shows, on a larger scale and in section, the same two plugs as in FIG. 4.

It appears from FIG. 5 that second ring plug 22 is provided with downwardly directed finger-like catchers 30 which are engaging an annular groove 32 in first ring plug 20 and, thus, lock first ring plug 20 to second ring plug 22. The catchers 30 are resilient, but a sleeve 34 surrounded by the catchers 30, secures the catchers 30 in engagement with the groove 32. The sleeve 34 is provided with an external thread spiral 36 resting against an internal annular end wall 38 of first ring plug 20. Upper ring plug 22 is attached to the coupling device 18 through an overload protection device or locking mechanism 40 which has been shown in a simplified form only. The locking mechanism 40 is secured by an axially displaceable internal sleeve 42 which, again, is locked by means of a locking pin 44, the locking pin 44 being kept in place by means of first ring plug 20. Thus, in order to disconnect second ring plug 22 from the coupling device 18, first ring plug 20 must be disconnected in order to release the locking pin 44, whereafter a displacement of the sleeve 42 neutralizes the effect of the locking mechanism 40.

Figure 6:
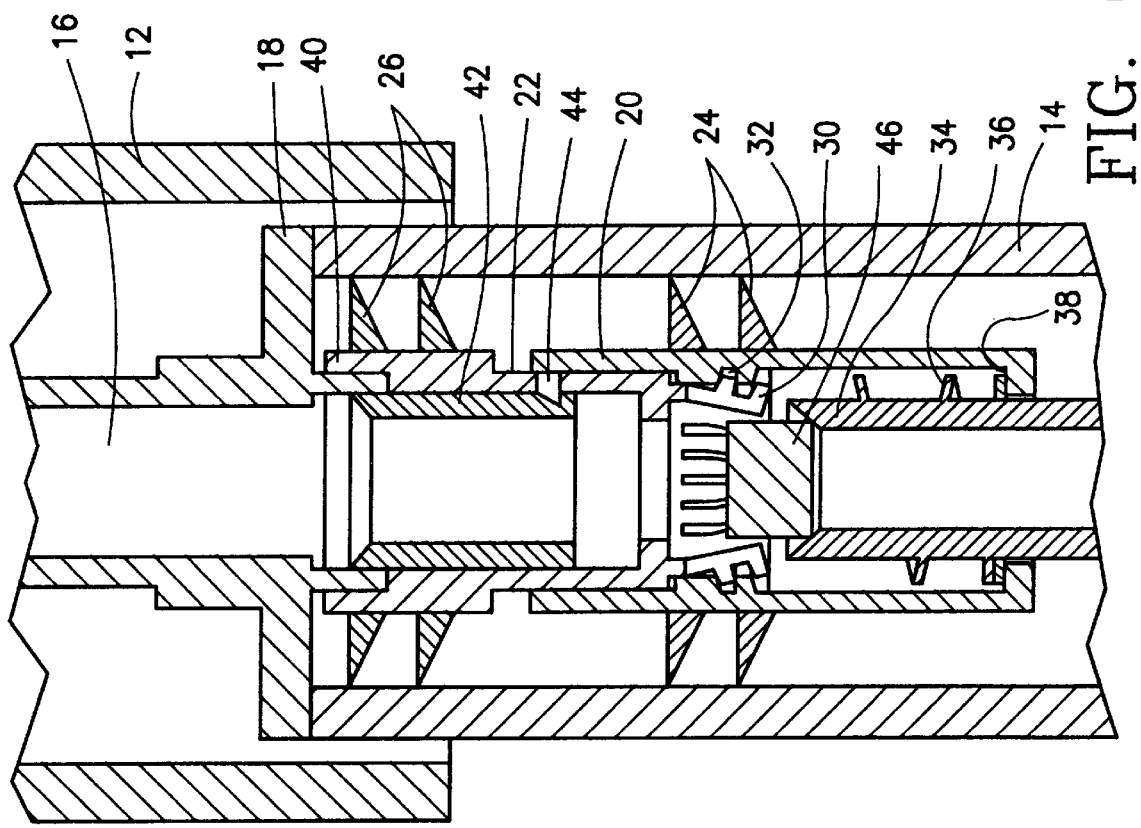
FIG. 6 shows the same two plugs as in FIG. 5, and where the lower plug is in the course of being disconnected from the upper plug.

In FIG. 6, there is shown a plug 46 adapted to seal slidingly internally in the supply pipe 16, while it is pressed forwardly by subsequent casting mass. The plug 46 has landed in the upper end of the sleeve 34 and blocks flow therethrough. When the pumping presure is increased as already explained, the thread spiral 36 is cut loose from the sleeve 34 which is pressed downwardly. When the sleeve 34 no longer is surrounded by the catchers 30, the latter yield and disengage the grooves 32. Thus, first ring plug 20 is free from second ring plug 22. Cutting of the thread spiral 36 stops, the plug 46 and first ring plug 20 with the sleeve 34 being pushed downwardly along the liner 14 by means of the liquid pressure.

Figure 7:
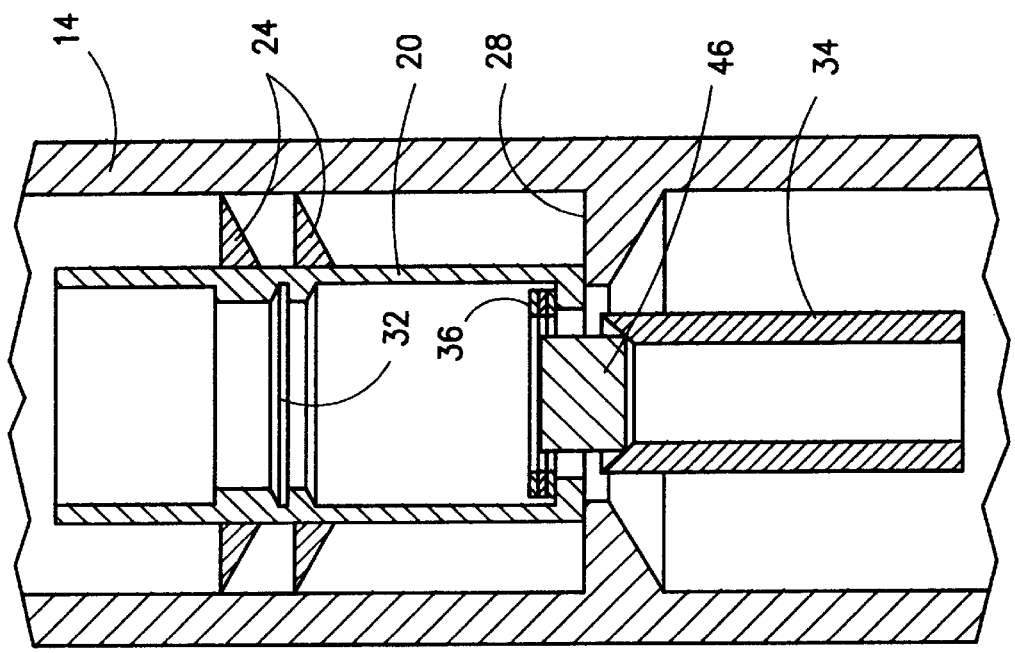
FIG. 7 shows the lower plug of FIG. 6 in a position close to the bottom of the oil well.

First ring plug 20 with the plug 46 resting sealingly against the upper end of the sleeve 34 presses then downwardly the liner 14 until first ring plug 20 lands on the annular land face 28 near the lower end of the liner 14, such as already explained with reference to FIG. 4. As the operator once more increases the pressure, the thread spiral 36 is cut loose from the sleeve 34 in the entire length thereof, such as shown in FIG. 7. Thus, the sleeve 34 with the plug 46 falls out beneath first ring plug 20 which, then, is open to flow therethrough.

With corresponding plugs of known type it is customary to use two sets of shear pins. The first set of shear pins is adapted to break when first ring plug is to be released from second ring plug, while the second set of shear pins is adapted to break when first ring plug shall be opened for flow therethrough.

Then, first set of shear pins must be adapted to be broken upon the occurence of a substantially lower load than the second set of shear pins. It happens that both sets of shear pins break upon the release of first ring plug from second ring plug. An assumed reason for this is that the plug and the sleeve, at the moment when first set of shear pins is broken, are accelerated such that the shear pins which keep a land area on which the sleeve is to land, are broken upon impact (landing). The shear pins are not in a position to absorb the kinetic energy of the sleeve, and they are broken. The result is that the sleeve and the plug approximately are shot straight through first ring plug, and the cementing operation does not succeed.

This type of problems are avoided when using an overload protection device in accordance with the invention.

I claim:

1. An overload protection device which comprises a body, a thread spiral which extends along said body and is connected thereto, said thread spiral having two opposed spaced-apart side faces including a first side face and a second side face, and means to facilitate progressive shearing of said thread spiral from said body when said thread spiral is subjected to a shearing force exceeding a predetermined value.

2. The overload protection device as claimed in claim 1, wherein said means to facilitate progressive shearing of said thread spiral from said body comprises a groove extending along the first side face of the thread spiral.

3. The overload protection device as claimed in claim 2, wherein said means to facilitate progressive shearing of said thread spiral from said body further comprises a groove extending along the second side face of the thread spiral.

4. An overload protection device which comprises an elongate body, and a thread spiral which extends along said elongate body said thread spiral having two opposed spaced-apart side faces including a first side face and a second side face, and said thread spiral connected to said elongate body in a manner such that when a force is applied to said thread spiral along said elongate body said thread spiral progressively shears from said elongate body.

5. The overload protection device as claimed in claim 4 wherein said thread spiral is provided with at least one groove which extends along the first side face thereof and which defines a line along which said thread spiral shears from said elongate body.

6. The overload protection device as claimed in claim 4 wherein said thread spiral is provided with a second groove which extends along the second side face thereof and which co-operates with said at least one groove to define a plane along which said thread spiral shears from said elongate body.

* * * * *